(12) United States Patent
Uemura et al.

(10) Patent No.: US 8,830,077 B2
(45) Date of Patent: Sep. 9, 2014

(54) ELECTRONIC DEVICE

(75) Inventors: Takeshi Uemura, Osaka (JP); Toshiyuki Nozoe, Kyoto (JP)

(73) Assignee: Panasonic Corporation, Osaka (JP)

( * ) Notice: Subject to any disclaimer, the term of this patent is extended or adjusted under 35 U.S.C. 154(b) by 680 days.

(21) Appl. No.: 12/741,467

(22) PCT Filed: Nov. 18, 2008

(86) PCT No.: PCT/JP2008/003356
§ 371 (c)(1),
(2), (4) Date: May 5, 2010

(87) PCT Pub. No.: WO2009/072240
PCT Pub. Date: Jun. 11, 2009

(65) Prior Publication Data
US 2010/0265082 A1 Oct. 21, 2010

(30) Foreign Application Priority Data
Dec. 7, 2007 (JP) ................................ 2007-316908

(51) Int. Cl.
G08B 21/00 (2006.01)
G01C 19/00 (2013.01)
G06F 3/01 (2006.01)
G11B 19/02 (2006.01)
G06F 1/16 (2006.01)

(52) U.S. Cl.
CPC ............. *G01C 19/00* (2013.01); *G06F 3/017* (2013.01); *G11B 19/02* (2013.01); *G06F 2200/1637* (2013.01); *G06F 1/1626* (2013.01); *G06F 1/1694* (2013.01)

USPC ............ 340/671; 340/670; 345/158; 345/169

(58) Field of Classification Search
USPC .......................... 340/671; 345/169, 145, 158
See application file for complete search history.

(56) References Cited

U.S. PATENT DOCUMENTS 6,271,831 B1 * 8/2001 Escobosa et al. ............. 345/158
6,433,690 B2 * 8/2002 Petelenz et al. ............ 340/573.1

(Continued)

FOREIGN PATENT DOCUMENTS

CN          1601447 A     3/2005
CN    2007-286812 A    11/2007

(Continued)

OTHER PUBLICATIONS

Chinese Office Action dated Jun. 24, 2011.

(Continued)

*Primary Examiner* — George Bugg
*Assistant Examiner* — Naomi Small
(74) *Attorney, Agent, or Firm* — Pearne & Gordon LLP

(57) ABSTRACT

An electronic device includes a case, an angular velocity sensor fixed to the case, a data memory storing plural reference profiles, an output unit operating in a plurality of operation modes corresponding to the reference profiles, and a processor controlling the output unit. The angular velocity sensor sends a signal according to an angular velocity applied to the case. The processor is operable to receive the signal sent from the angular velocity sensor, to select a reference profile out of the plural reference profiles according to the received signal, and to cause the output unit to operate in an operation mode out of the plural operation modes corresponding to the selected reference profile. A user can operate this electronic device with a quick response.

12 Claims, 12 Drawing Sheets

(56) References Cited

U.S. PATENT DOCUMENTS

| | | |
|---|---|---|
| 7,301,528 B2* | 11/2007 | Marvit et al. .................. 345/156 |
| 7,499,040 B2 | 3/2009 | Zadesky et al. |
| 8,242,894 B2* | 8/2012 | Kutaragi .................... 340/13.24 |
| 2002/0084912 A1* | 7/2002 | Stefanik .................. 340/825.69 |
| 2006/0236761 A1* | 10/2006 | Inoue et al. ...................... 73/510 |
| 2006/0281453 A1* | 12/2006 | Jaiswal et al. ................ 455/423 |
| 2007/0013539 A1* | 1/2007 | Choi et al. .................... 340/671 |
| 2007/0265088 A1* | 11/2007 | Nakada et al. .................. 463/37 |
| 2008/0001770 A1 | 1/2008 | Ito et al. |
| 2008/0055243 A1* | 3/2008 | Gordon et al. ................ 345/157 |
| 2008/0300055 A1* | 12/2008 | Lutnick et al. .................. 463/39 |
| 2009/0009478 A1* | 1/2009 | Badali et al. .................. 345/169 |
| 2009/0066506 A1* | 3/2009 | Niizawa et al. ............... 340/540 |

FOREIGN PATENT DOCUMENTS

| | | |
|---|---|---|
| JP | 07-160411 A | 6/1995 |
| JP | 11-099284 A | 4/1999 |
| JP | 2007-286812 A | 11/2007 |
| WO | 2005/019987 A2 | 3/2005 |

OTHER PUBLICATIONS

International Search Report for PCT/JP2008/003356.

* cited by examiner

PRIOR ART

ELECTRONIC DEVICE

This application is a U.S. National Stage Application of the PCT International Application No. PCT.JP2008/003356.

Technical Field

The present invention relates to an electronic device, such as a portable player, operable by a user.

BACKGROUND ART

FIGS. 15 and 16 are a top view and a block diagram of conventional electronic device 501, respectively. Electronic device 501 includes touch pad 1 pressed by a user, processor 2 receiving a signal from touch pad 1, data memory 3 connected to processor 2, and output unit 4 connected to processor 2. Processor 2 selects a control signal stored in data memory 3 based on a signal from touch pad 1. Processor 2 controls output unit 4 according to the selected control signal.

Electronic device 501 is a portable sound player. When a user presses fast-forward play pad 1A of touch pad 1 shown in FIG. 15 while output unit 4 plays music, touch pad 1 sends a signal corresponding to pad 1A to processor 2. On the basis of the signal, processor 2 selects a control signal from data memory 3 to fast-forward plays the music played by output unit 4.

A user is required to press a predetermined portion of touch pad 1 as to reliably operate conventional electronic device 501. Hence, the user needs to identify the predetermined portion before operating electronic device 501, which decreases operation response.

Patent Document 1 discloses a conventional electronic device including such a touch pad.

Patent Document 1: JP 2007-503052T

SUMMARY OF THE INVENTION

An electronic device includes a case, an angular velocity sensor fixed to the case, a data memory storing plural reference profiles, an output unit operating in a plurality of operation modes corresponding to the reference profiles, and a processor controlling the output unit. The angular velocity sensor sends a signal according to an angular velocity applied to the case. The processor is operable to receive the signal sent from the angular velocity sensor, to select a reference profile out of the plural reference profiles according to the received signal, and to cause the output unit to operate in an operation mode out of the plural operation modes corresponding to the selected reference profile.

A user can operate this electronic device with a quick response.

REFERENCE NUMERALS

11 Case
12 Angular Velocity Sensor
13 Processor
14 Data Memory
17 Output Unit
18 Sound Memory
19 A/D Converter
20 Display
1001 Electronic Device
1002 Electronic Device

DETAILED DESCRIPTION OF PREFERRED EMBODIMENTS

Figure 1A:
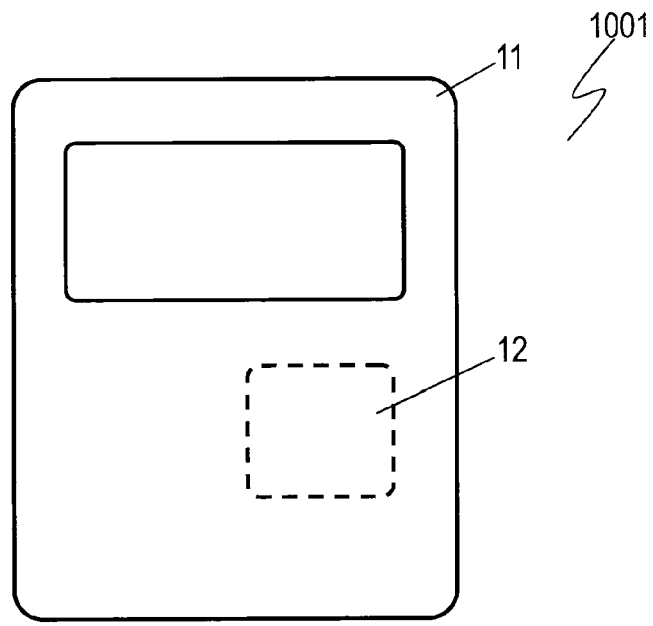
FIG. 1A is a top view of an electronic device according to an exemplary embodiment of the present invention.
Figure 1B:
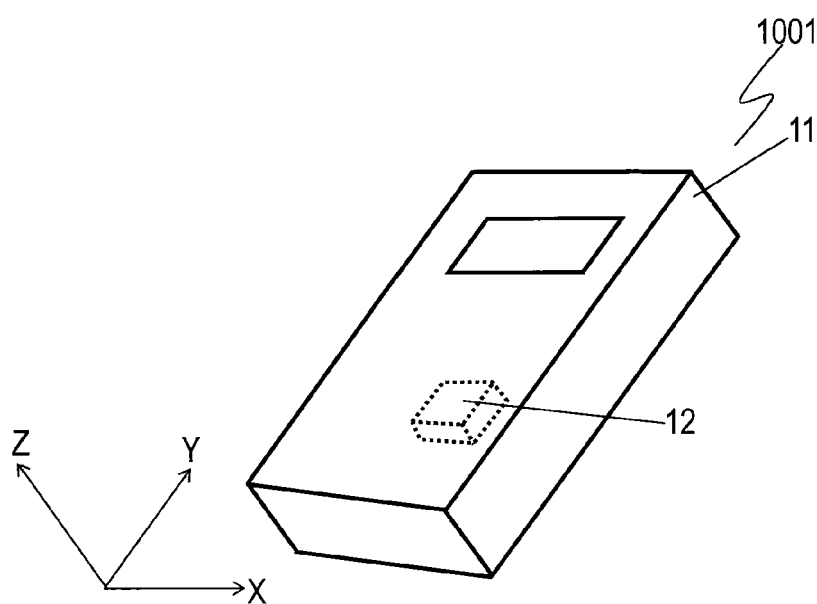
FIG. 1B is a perspective view of the electronic device according to the embodiment.
Figure 2:
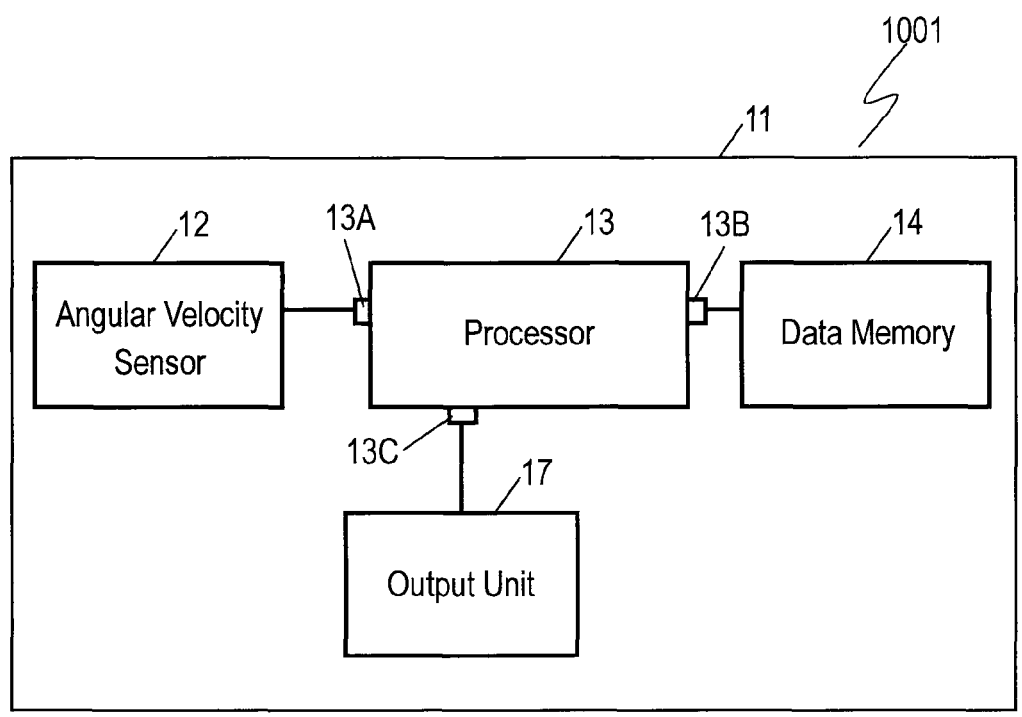
FIG. 2 is a block diagram of the electronic device according to the embodiment.

FIGS. 1A, 1B, and 2 are a top view, a perspective view, and a block diagram of electronic device 1001 according to an exemplary embodiment of the present invention, respectively. Electronic device 1001 includes case 11, angular velocity sensor 12 placed in case 11, processor 13, data memory 14, and output unit 17. Processor 13 is connected to angular velocity sensor 12 via terminal 13A, and receives a signal from sensor 12. Data memory 14 is electrically connected to processor 13 via terminal 13B. Output unit 17 is electrically connected to processor 13 via terminal 13C. Angular velocity sensor 12 is fixed to case 11. As shown in FIG. 1B, an X-axis, a Y-axis, and a Z-axis perpendicular to each other are defined with respect to case 11. Angular velocity sensor 12 sends processor 13 signals Sx, Sy, and Sz indicating angular velocities about the X, Y, and Z axes applied on case 11, respectively.

Figure 3:
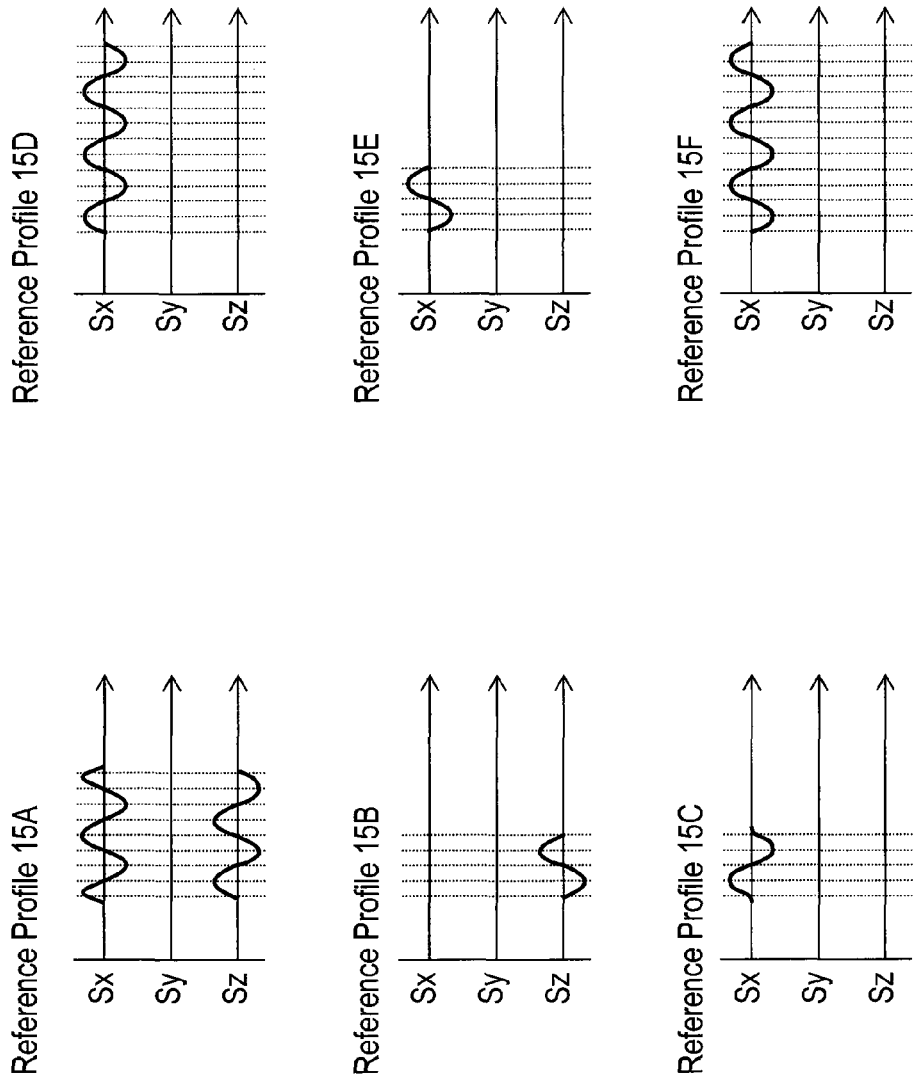
FIG. 3 shows reference profiles stored in a memory of the electronic device according to the embodiment.

Data memory 14 previously stores plural reference profiles. Each reference profile is represented by a set of Sx, Sy, and Sz indicating an angular velocity applied on angular velocity sensor 12 (case 11). FIG. 3 shows plural reference profiles 15A to 15F.

When a user applies an angular velocity to case 11, angular velocity sensor 12 detects the angular velocity and sends signals Sx, Sy, and Sz indicating the angular velocity detected to processor 13. Processor 13 selects a set of reference profiles, out of the plural sets of reference profile 15A to 15F stored in data memory 14, closest to signals Sx, Sy, and Sz received from sensor 12. Processor 13 controls output unit 17 according to the selected reference profile.

Figure 4:
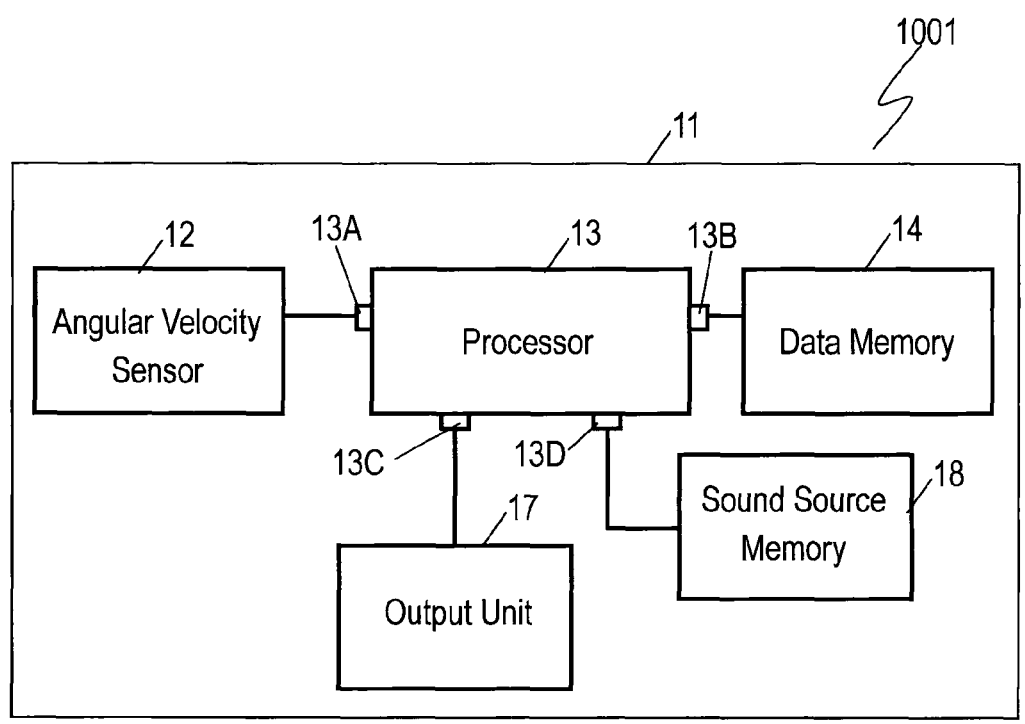
FIG. 4 is a block diagram of the electronic device according to the embodiment.

An operation of electronic device 1001 according to the embodiment will be described below. FIG. 4 is a block diagram of device 1001, a portable sound player. In this case, electronic device 1001 further includes sound memory 18 electrically connected to terminal 13D of processor 13. Sound memory 18 stores plural sound sources. Processor 1a causes output unit 17 to output the sound sources stored in sound source memory 18. Output unit 17 is implemented by an audio output device, such as a speaker or a headphone.

A user operates electronic device 1001, for instance, in the following way. First, the user switches device 1001 from a stop mode in which electronic device 1001 stops to a play mode in which output unit 17 plays a sound source. Next, the user switches electronic device 1001 from the play mode to a fast-forward play mode in which output unit 17 fast-forward plays a sound source. After that, the user switches electronic device 1001 from the fast-forward play mode to a reverse play mode in which output unit 17 reverse plays a sound source. Next, the user switches electronic device 1001 from the reverse play mode to a previous-source play mode in which output unit 17 plays the sound source stored at a position immediately before the sound source currently played selected from the plural sound sources stored in sound source memory 18. After that, the user switches electronic device 1001 to a next sound source play mode in which output unit 17 plays the sound source stored at a position immediately after the sound source currently played selected from the plural sound sources stored in sound source memory 18. Next, the user changes device 1001 from the play mode to a pause mode in which output unit 17 temporarily stops playing a sound source. After that, the user changes electronic device 1001 from the pause mode to the play mode, and finally changes electronic device 1001 from the play mode to the stop mode. Thus, device 1001 operates in the stop mode, in the play mode, in the fast-forward play mode, in the reverse play mode, in the previous sound source play mode, in the next sound source play mode, and in the pause mode.

Figure 5:
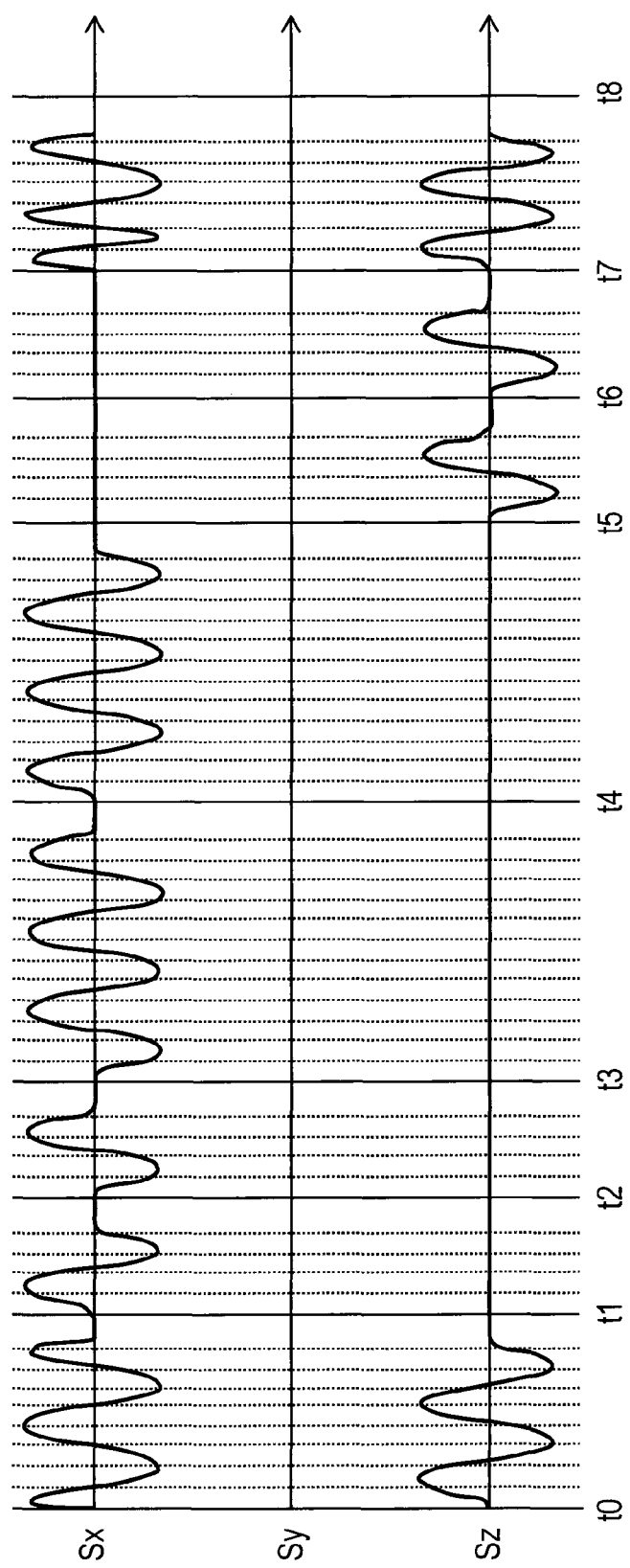
FIG. 5 shows signals from an angular velocity sensor of the electronic device according to the embodiment.

FIG. 5 shows signals Sx, Sy, and Sz output from angular velocity sensor 12 when the user operates electronic device 1001 as described above. FIGS. 6 to 13 are perspective views of electronic device 1001 being operated.

Figure 6:
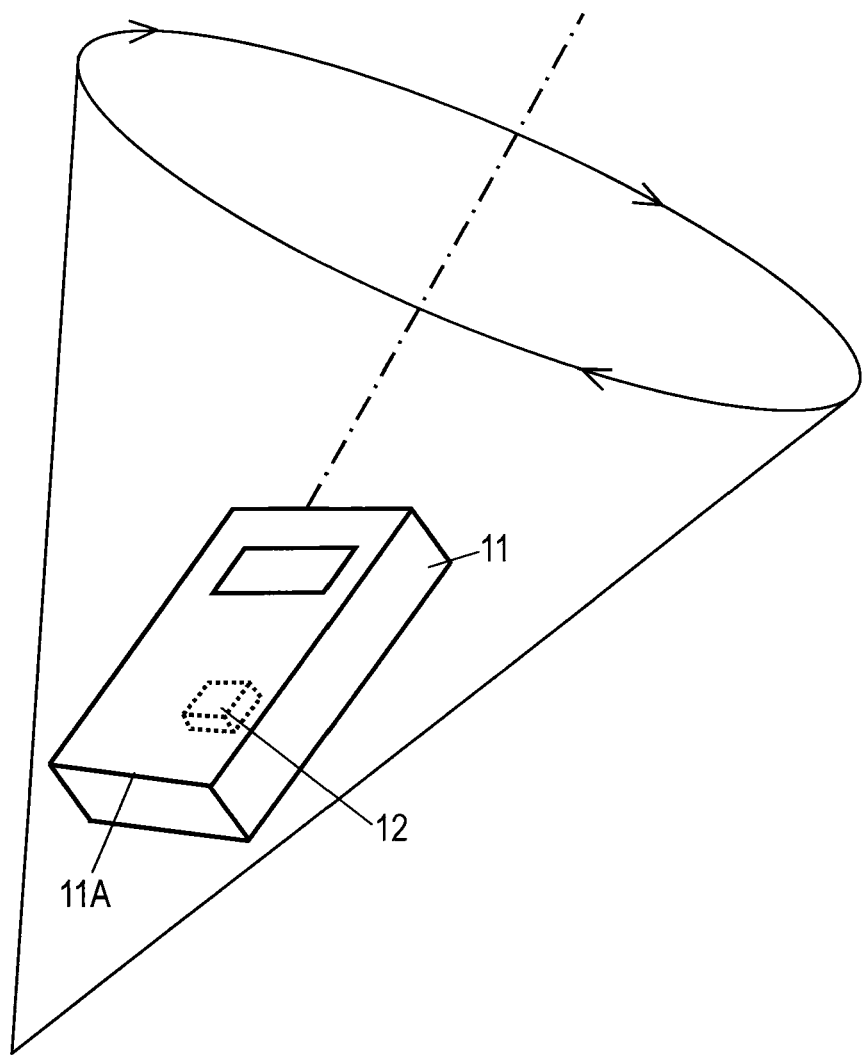
FIG. 6 is a perspective view of the electronic device according to the embodiment for illustrating an operation of the electronic device.

As shown in FIG. 6, the user first moves and rotates case 11 while supporting lower end 11A of case 11 as a fulcrum from time point t0 to t1 shown in FIG. 5 so that the Y-axis forms substantially a conical surface. At this moment, angular velocity sensor 12 is applied angular velocities about the X-axis and the Z-axis to, and is not applied an angular velocity about the Y-axis. Angular velocity sensor 12 outputs signals Sx, Sy, and Sz indicating these angular velocities to processor 13. The set of the signals Sx, Sy, and Sz is closest to reference profile 15A out of plural reference profiles 15A to 15F stored in data memory 14. Hence, processor 13 selects reference profile 15A out of reference profiles 15A to 15F. Reference profile 15A corresponds to the play mode. Accordingly, processor 13 sends a play signal to output unit 17 to cause electronic device 1001 operate in the play mode, that is, plays one sound source out of the plural sound sources stored in sound source memory 18 from output unit 17.

Figure 7:
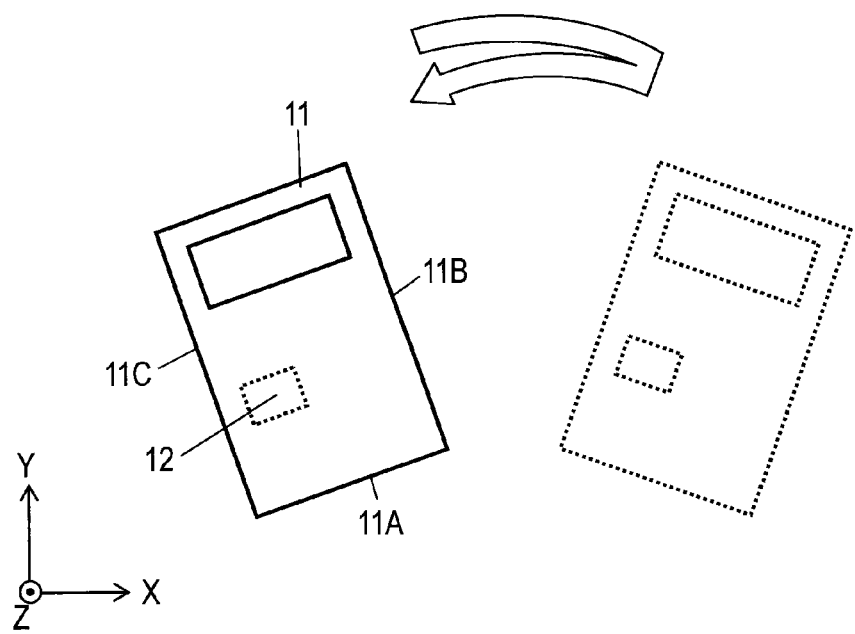
FIG. 7 is a top view of the electronic device according to the embodiment for illustrating another operation.

Next, as shown in FIG. 7, the user moves case 11 about the Z-axis reciprocatively once on an XY-plane containing the X-axis and the Y-axis while supporting lower end 11A of case 11 as a fulcrum from time point t1 to t2 shown in FIG. 5. That is, case 11 moves toward side surface 11B of case 11 so that the Y-axis and the X-axis form substantially a fan shape, and then case 11 moves towards side surface 11C opposite to side surface 11B so that the Y-axis and the X-axis form substantially s fan shape. At this moment, angular velocity sensor 12 is applied an angular velocity about the Z axis to, and is not applied an angular velocity about the X-axis or the Y-axis to. Angular velocity sensor 12 sends signals Sx, Sy, and Sz indicating the angular velocity to processor 13. The set of the signals Sx, Sy, and Sz is closest to reference profile 15C out of plural reference profiles 15A to 15F stored in data memory 14. Hence, processor 13 selects reference profile 15C out of reference profiles 15A to 15F. Reference profile 15C corresponds to the fast-forward play mode. Processor 13 sends a fast-forward play signal to output unit 17 to cause electronic device 1001 to operate in the fast-forward play mode, that is, fast-forward plays a sound source from output unit 17.

In FIG. 7, the user may move case 11 about the Z-axis while holding case 11 slightly inclining about the Y-axis or the X-axis by, e.g. 15 degrees. In this case, angular velocity sensor 12 is applied not only the angular velocity about the Z-axis, but also angular velocities about the Y-axis and the X-axis. However, the angular velocities about the Y-axis and the X-axis are extremely smaller than the angular velocity about the Z-axis, thus causing the amplitude of signal Sz to be extremely larger than the amplitudes of signals Sx and Sy. Processor 13 neglects signals Sx and Sy with ratios of the amplitudes of signals Sx and Sy to the maximum amplitude out of the amplitudes of signals Sx to Sz being smaller than a predetermined ratio value to qualify the amplitudes of signals Sx and Sy as zero, thus selecting reference profile 15C out of plural reference profiles 15A to 15F. Alternatively, processor 13 can neglect signal Sy with an amplitude smaller than a predetermined value out of the amplitudes of signals Sx to Sz to qualify the amplitude of signal Sy as zero.

Figure 8:
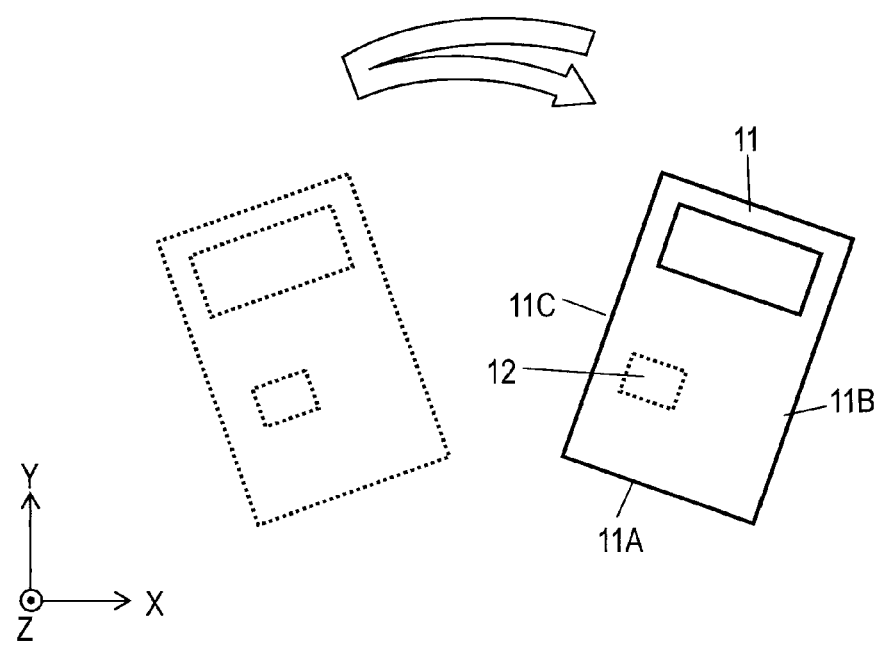
FIG. 8 is a top view of the electronic device according to the embodiment for illustrating still another operation.

Next, as shown in FIG. 8, the user moves case 11 once reciprocatively about the Z-axis on the XY plane containing the X-axis and the Y-axis while supporting lower end 11A of case 11 as a fulcrum in a direction opposite to the direction shown in FIG. 7 from time point t2 to t3 shown in FIG. 5. That is, case 11 moves towards side surface 11C of case 11 so that the Y-axis and the X-axis form substantially s fan shape, and then, case 11 moves towards side surface 11B so that the Y-axis and the X-axis form substantially s fan shape. At this moment, angular velocity sensor 12 is applied angular velocity about the Z-axis to, and is not applied an angular velocity about the X-axis or the Y-axis to. Angular velocity sensor 12 sends signals Sx, Sy, and Sz indicating the angular velocity to processor 13. The set of the signals Sx, Sy, and Sz is closest to reference profile 15E out of plural reference profiles 15A to 15F stored in data memory 14. Processor 13 selects reference profile 15E out of reference profiles 15A to 15F. Reference profile 15E corresponds to the reverse play mode. Processor 13 sends a reverse play signal to output unit 17 to cause electronic device 1001 to operate in the reverse play mode, that is, reverse plays a sound source from output unit 17

Figure 9:
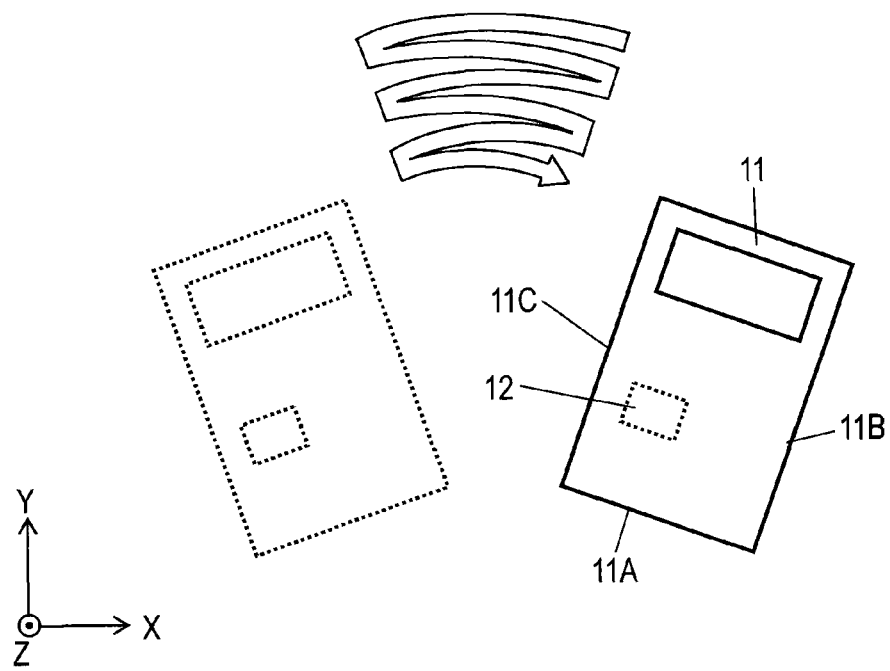
FIG. 9 is a top view of the electronic device according to the embodiment for illustrating a further operation.

Next, as shown in FIG. 9, the user moves case 11 thrice reciprocatively about the Z-axis on the XY plane containing the X-axis and the Y-axis while supporting lower end 11A of case 11 as a fulcrum from time point t3 to t4 shown in FIG. 5. That is, case 11 moves towards side surface 11B of case 11 so that the Y-axis and the X-axes form substantially s fan shape, and then, case 11 moves towards side surface 11C opposite to side surface 11B so that the Y-axis and the X-axis form substantially s fan shape. After that, the above movement is repeated twice. At this moment, angular velocity sensor 12 is applied an angular velocity about the Z-axis to, and is not applied an angular velocity about the X-axis or the Y-axis.

Angular velocity sensor 12 sends signals Sx, Sy, and Sz indicating the angular velocity to processor 13. The set of the signals Sx, Sy, and Sz is closest to reference profiles 15F out of plural reference profiles 15A to 15F stored in data memory 14. Processor 13 selects reference profile 15F out of reference profiles 15A to 15F. Reference profile 15F corresponds to the previous sound source play mode. Processor 13 sends a previous sound source play signal to output unit 17 to cause electronic device 1001 to operate in the previous sound source play mode, that is, to play, output unit 17, a sound source positioned immediately before the sound source currently played out of the plural sound sources stored in sound source memory 18.

Figure 10:
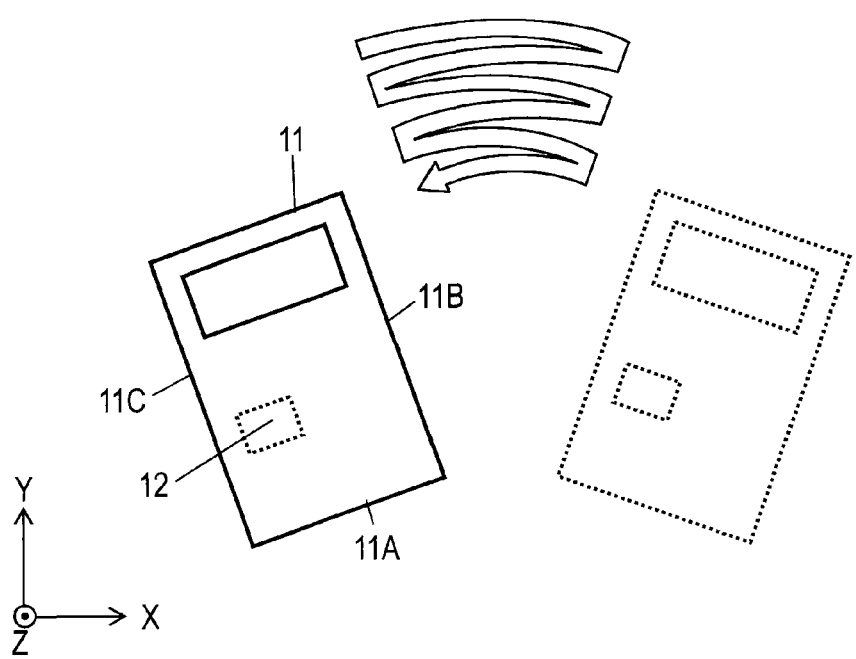
FIG. 10 is a top view of the electronic device according to the embodiment for illustrating a further operation.

Next, as shown in FIG. 10, the user moves case 11 thrice reciprocatively in the direction opposite to the direction shown in FIG. 9 about the Z-axis on the XY plane containing the X-axis and the Y-axes while supporting lower end 11A of case 11 as a fulcrum from time point t4 to t5 shown in FIG. 5. That is, case 11 moves towards side surface 11C of case 11 so that the Y-axis and the X-axis form substantially s fan shape, an then, case 11 moves towards side surface 11B so that the Y-axis and the X-axis form substantially fan shape. After that, the movement is repeated twice. At this moment, angular velocity sensor 12 is applied angular velocity about the Z-axis, an dis not applied an angular velocity about the X-axis or the Y-axis. Angular velocity sensor 12 sends signals Sx, Sy, and Sz indicating the angular velocity to processor 13. The set of the signals Sx, Sy, and Sz is closest to reference profile 15D out of plural reference profiles 15A to 15F stored in data memory 14. Processor 13 selects reference profile 15D out of reference profiles 15A to 15F. Reference profile 15D corresponds to the next sound source play mode. Processor 13 sends a next sound source play signal to output unit 17 to cause electronic device 1001 to operate in the next sound source play mode, that is, to play, from output unit 17, a sound source positioned immediately after the currently played sound source out of the plural sound sources stored in sound source memory 18.

Figure 11:
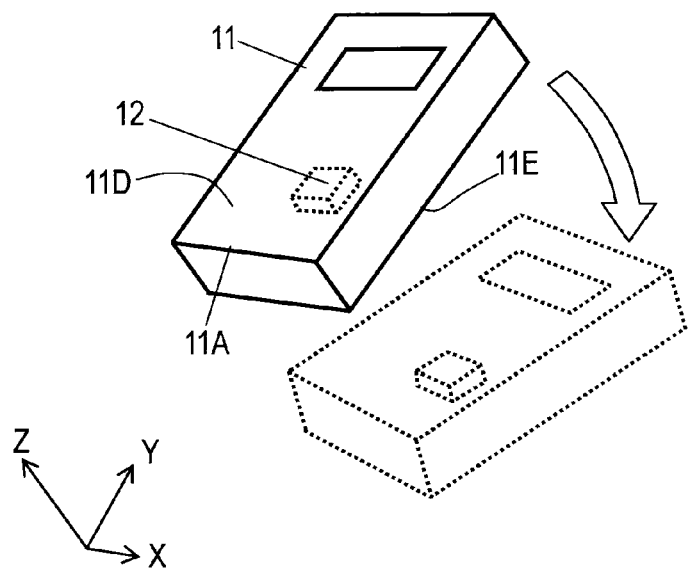
FIG. 11 is a perspective view of the electronic device according to the embodiment for illustrating a further operation.

Next, as shown in FIG. 11, the user moves once case 11 about the X-axis on the YZ plane containing the Y-axis and the Z-axis while supporting lower end 11A of case 11 as a fulcrum from time point t5 to t6 shown in FIG. 5. That is, case 11 moves in a direction from front surface 11D to back surface 11E of case 11 so that the Y-axis and the Z-axis form substantially s fan shape. At this moment, angular velocity sensor 12 is applied an angular velocity about the X-axis, and is not applied an angular velocity about the Y-axis or the Z-axis. Angular velocity sensor 12 sends signals Sx, Sy, and Sz indicating the angular velocity to processor 13. The set of the signals Sx, Sy, and Sz is closest to reference profile 15B out of plural reference profiles 15A to 15F stored in data memory 14. Processor 13 selects reference profile 15B out of reference profiles 15A to 15F. Reference profile 15B corresponds to the pause mode. Processor 13 sends a pause signal to output unit 17 to cause electronic device 1001 to operate in the pause mode, that is, to temporarily stop the sound source currently played from output unit 17.

Figure 12:
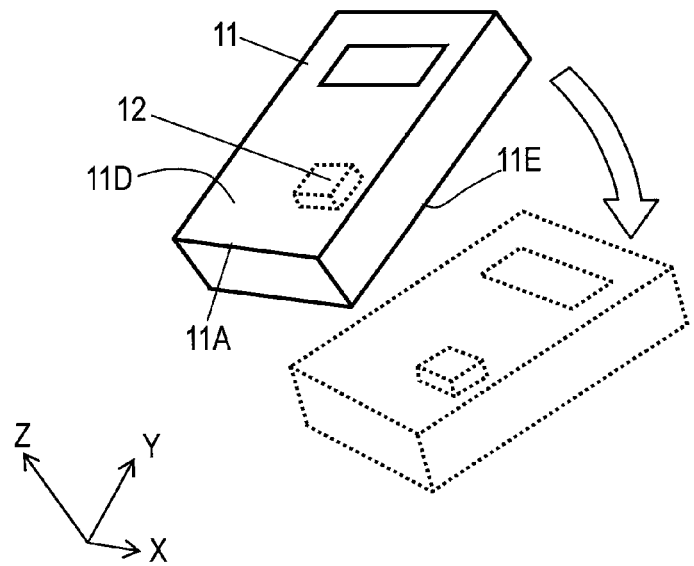
FIG. 12 is a perspective view of the electronic device according to the embodiment for illustrating a further operation.

Next, as shown in FIG. 12, the user moves case 11 once about the X-axis on the YZ plane containing the Y-axis and the Z-axis again while supporting lower end 11A of case 11 as a fulcrum from time point t6 to t7 shown in FIG. 5. That is, case 11 moves in a direction from front surface 11D to back surface 11E of case 11 so that the Y-axis and the Z-axis form substantially a fan shape. At this moment, angular velocity sensor 12 is applied an angular velocity centering about the X-axis, and is not applied an angular velocity about the Y-axis or the Z-axis. Angular velocity sensor 12 sends signals Sx, Sy, and Sz indicating the angular velocity to processor 13. The set of the signals Sx, Sy, and Sz is closest to reference profile 15B out of plural reference profiles 15A to 15F stored in data memory 14. Processor 13 selects reference profile 15B out of reference profiles 15A to 15F. Reference profile 15B corresponds to the pause mode. When processor 13 selects reference profile 15B corresponding to the pause mode while electronic device 1001 operates in the pause mode, processor 13 sends a play signal to output unit 17 to change the operation mode of electronic device 1001 from the pause mode to the play mode to cause electronic device 1001 to play, from output unit 17, the sound source temporarily stopped.

Figure 13:
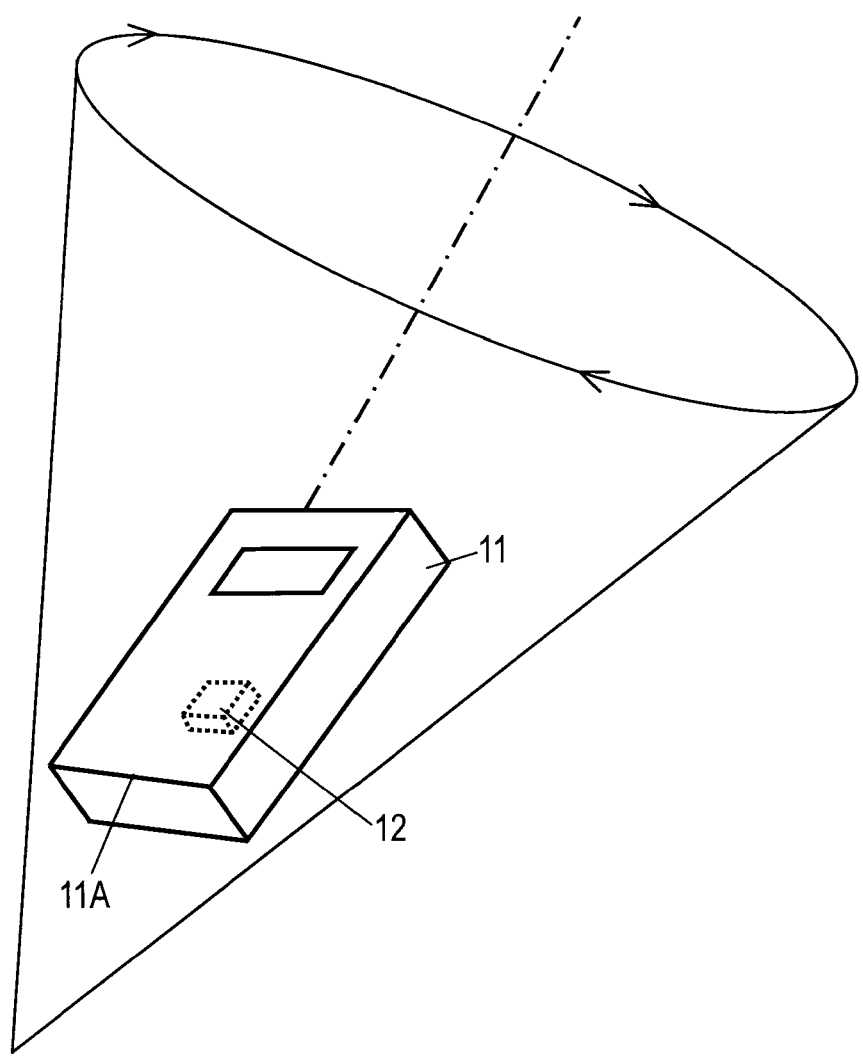
FIG. 13 is a perspective view of the electronic device according to the embodiment for illustrating a further operation.

Next, as shown in FIG. 13, the user moves and rotates case 11 so that the Y-axis forms substantially s conical surface while supporting lower end 11A of case 11 as a fulcrum from time point t7 to t8 shown in FIG. 5. At this moment, angular velocity sensor 12 is applied angular velocities about the X-axis and the Z-axis to, and is not applied an angular velocity about the Y-axis. Angular velocity sensor 12 sends signals Sx, Sy, and Sz indicating the angular velocities to processor 13. The set of the signals Sx, Sy, and Sz is closest to reference profile 15A out of plural reference profiles 15A to 15F stored in data memory 14 shown in FIG. 3. Processor 13 selects reference profile 15A out of reference profiles 15A to 15F. Reference profile 15A corresponds to the play mode as shown in FIG. 3. When processor 13 selects reference profile 15A corresponding to the play mode while electronic device 1001 operates in the play mode, processor 13 sends a stop signal to output unit 17 to change the operation mode of electronic device 1001 from the play mode to the stop mode, that is, causes electronic device 1001 to stop currently playing the sound source from output unit 17.

As shown in FIGS. 6 to 13, the user swings and rotates case 11 with angular velocity sensor 12 fixed thereto to apply an angular velocity to velocity sensor 12, thereby causing processor 13 to control output unit 17. This operation allows the user to operate electronic device 1001 with a high sensitivity without confirming a specific part of electronic device 1001. That is, output unit 17 operates in plural operation modes, such as the play mode, the fast-forward play mode, the reverse play mode, the previous sound source play mode, and the next sound source play mode, corresponding to reference profiles 15A to 15F, respectively. Processor 13 receives signals Sx, Sy, and Sz sent from angular velocity sensor 12 and selects a reference profile out of reference profiles 15A to 15F based on the signals Sx, Sy, and Sz. Then, processor 13 causes output unit 17 to operate in an operation mode corresponding to the selected reference profile. Sound source memory 18 stores plural sound sources. Processor 13 operates to cause output unit 17 to output the stored sound source in an operation mode corresponding to the selected reference profile. Sound source memory 18 stores plural sound sources. Processor 13 selects a sound source out of the plural sound sources corresponding to eth elected reference profile to cause output unit 17 to output the selected sound source.

FIG. 3 shows sets of signals Sx, Sy, and Sz sent from angular velocity sensor 12. Processor 13 compares reference profiles 15A to 15F with the sets of signals Sx, Sy, and Sz to select a reference profile out of the reference profiles 15A to 15F closest to the set of signals Sx, Sy, and Sz. Processor 13 can compare a set of signals obtained by differentiating or integrating the signals sent from angular velocity sensor 12 with plural reference profiles corresponding to the set of signals.

Electronic device 1001 shown in FIG. 4 includes sound source memory 18 storing plural sound sources, but does not necessarily store any sound source. The electronic device according to the embodiment can include a receiver for receiving plural broadcasts instead of sound source memory 18. This electronic device can select a broadcast out of the plural broadcasts by the user applying an angular acceleration to case 11 as shown in FIGS. 6 to 13.

Figure 14:
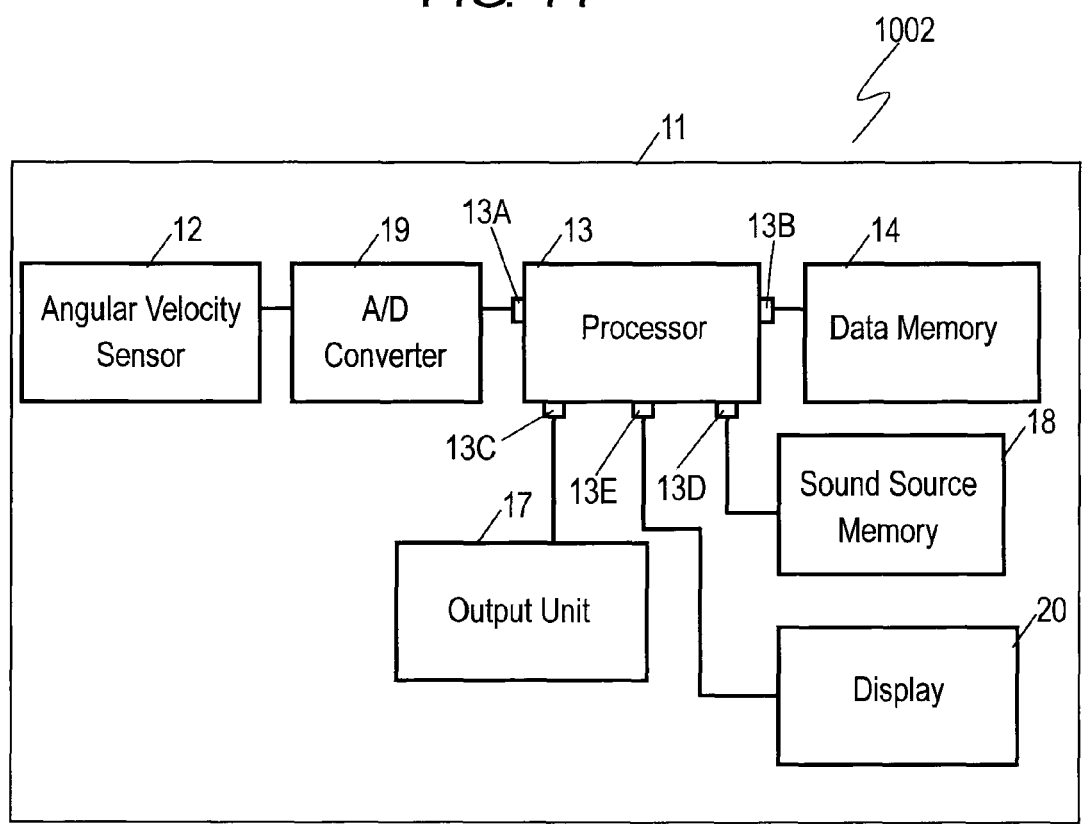
FIG. 14 is a block diagram of another electronic device according to the embodiment.
Figure 15:
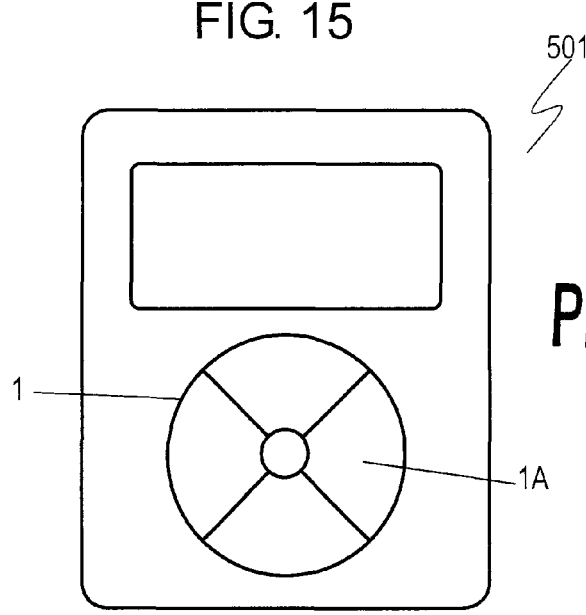
FIG. 15 is a top view of a conventional electronic device.
Figure 16:
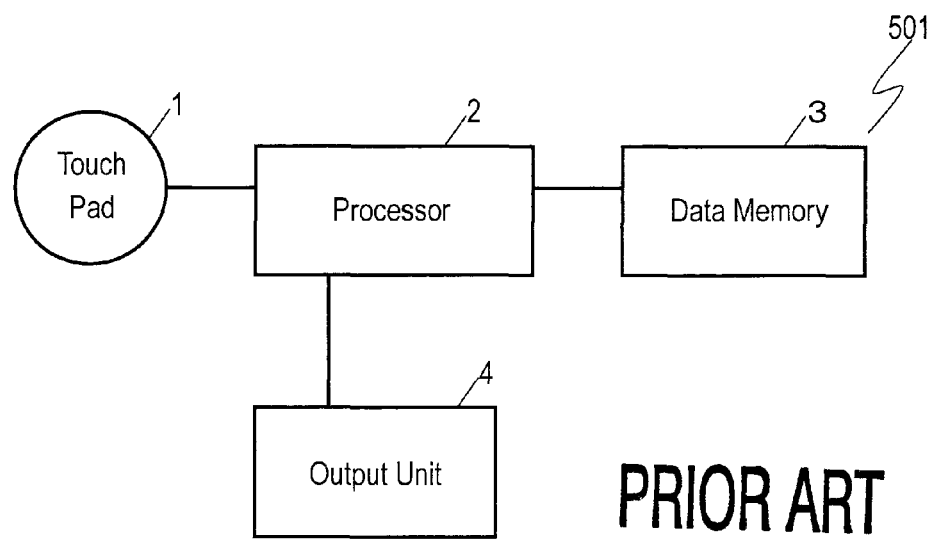
FIG. 16 is a block diagram of the conventional electronic device.

FIG. 14 is a block diagram of another electronic device 1002 according to the embodiment. Components identical to those of electronic device 1001 shown in FIGS. 1 and 4 are denoted by the same reference numerals, and their description will be omitted. Electronic device 1002 shown in FIG. 14 further includes A/D converter 19 provided between angular velocity sensor 12 and processor 13 of electronic device 1001 shown in FIGS. 1 and 4. Signals Sx, Sy, and Sz sent from angular velocity sensor 12 are analog signals. A/D converter 19 converts signals Sx, Sy, and Sz to digital signals and sends the digital signals to processor 13. The reference profiles stored in data memory 14 of electronic device 1002 are digital data, hence allowing processor 13 to control output unit 17 at a high speed.

Electronic device 1002 further includes display 20 electrically connected to processor 13 via terminal 13E. Processor 13 changes an indication on display 20 in response to the operation mode to play a sound source, thereby allowing the user to realize the operation mode to play a sound source. In other words, display 20 produces an indication changing according to an operation mode corresponding to the selected reference profile.

As shown in FIG. 3, none of reference profiles 15A to 15F indicate an angular velocity about the Y-axis. In the case that the ratio of the amplitude of signal Sy to the maximum amplitude out of signals Sx and Sz is smaller than a predetermined ratio, or I the case that the amplitude of signal Sy is smaller than a predetermined amplitude, processor 13 compares signals Sx and Sz with reference profiles 15A to 15F. This operation allows processor 13 selects a reference profile closest to signals Sx and Sz out of reference profiles 15A to 15F and controls output unit 17 based on the elected reference profile. In the case that the ratio of the amplitude of signal Sy to the maximum amplitude out of signals Sx and Sz is larger than a predetermined ratio, or in the case that the amplitude of signal Sy is larger than a predetermined amplitude, the processor can judges that the angular velocity is applied not in order to operate electronic device 1001, but due to otherwise (e.g. conveying electronic device 1001). In this case, even if signals Sx and Sz with a predetermined amplitude are sent from angular velocity sensor 12, processor 13 does not change the operation mode of output unit 17. An angular velocity occurs artificially rather than an acceleration does. Hence, electronic device 1001 operating with angular velocity is prevented more from erroneously operating due to conveying or a shock than a device detecting an acceleration.

Industrial Applicability

An electronic device according to the present invention can be operated by a user with a quick response, hence being useful for an electronic device, such as a portable sound source player.

The invention claimed is:

1. An electronic device comprising:
a case;
an angular velocity sensor fixed to the case and sending a plurality of signals according to a plurality of components of an angular velocity applied to the case, the plurality of components of the angular velocity being about a plurality of axes, respectively;
a data memory storing a reference profile;
an output unit operating in an operation mode corresponding to the reference profile; and
a processor operable to cause the output unit to operate according to the plurality of signals sent from the angular velocity sensor,
wherein the reference profile contains a plurality of components which are compared with the plurality of signals, respectively,
wherein the processor is operable to:
cause the output unit to operate in an operation mode; and
determine, according to one signal of the plurality of signals, whether or not the processor causes the output unit to operate in the operation mode wherein, if the amplitude of the one signal is larger than a predetermined amplitude, the processor does not change the operation mode of the output unit.

2. The electronic device of claim 1, further comprising an A/D converter provided between the angular velocity sensor and the processor, and converting the signal sent from the angular velocity sensor to a digital signal, wherein the plurality of reference profiles stored in the data memory are digital data.

3. The electronic device of claim 1, further comprising a sound source memory storing a sound source, wherein the processor is operable to cause the output unit to output the stored sound source in the operation mode corresponding to the selected reference profile.

4. The electronic device of claim 1, further comprising a sound source memory storing a plurality of sound sources, wherein the processor is operable to
select a sound source out of the plurality of sound sources corresponding to the selected reference profile, and
cause the output unit to output the selected sound source.

5. The electronic device of claim 1, further comprising a display producing an indication changing according to the operation mode out of the plurality of operation modes corresponding to the selected reference profile.

6. The electronic device of claim 1, wherein, if a ratio of the amplitude of the one signal to a maximum amplitude out of the plurality of signals is larger than a predetermined ratio, the processor does not change the operation mode of the output unit.

7. The electronic device of claim 1, wherein the operational mode is one or more of: a pause mode, a play mode, a fast-forward play mode, and a rewind play mode.

8. The electronic device of claim 1, wherein a data memory stores a plurality of reference profiles, the output unit is operable in a plurality of operation modes corresponding to the reference profiles, the processor is operable to select a reference profile out of the plurality of reference profiles by comparing the plurality of signals with the plurality of components of each of the plurality of reference profiles.

9. The electronic device of claim 7, wherein an X-axis, a Y-axis, and a Z-axis perpendicular to each other are defined with respect to the case, and the Y-axis is set in a longitudinal direction of the case, and the angular velocity sensor sends processor signals Sx, Sy, and Sz indicating angular velocities about the X, Y, and Z axes applied on the case, wherein, if the ratio of the amplitude of the signal Sy to an amplitude of the signal Sx or the signal Sz is larger than the predetermined ratio, the processor does not change the operation mode of the output unit.

10. The electronic device of claim 1, wherein each of the plurality of components contained in the reference profile is a combination of a predetermined amplitude of an angular velocity in an X axis, a Y axis, and a Z axis perpendicular to each other defined with respect to the case, each of the combination of the predetermined amplitude of the angular velocity in the X axis, Y axis, and Z axis corresponds to a different command to operate the electronic device.

11. An electronic device comprising:
a case;
an angular velocity sensor fixed to the case and sending a plurality of signals according to a plurality of components of an angular velocity applied to the case, the plurality of components of the angular velocity being about a plurality of axes, respectively;
a data memory storing a reference profile;
an output unit configured to operate the electronic device according to a command corresponding to the reference profile; and
a processor operable to cause the output unit to operate according to the signals sent from the angular velocity sensor,
wherein the reference profile contains a plurality of components which are compared with the plurality of signals, respectively,
wherein the processor is configured to operate to:
cause the output unit to operate the electronic device according to the command; and
determine, according to one signal of the plurality of signals, whether or not the processor causes the output unit to operate the electronic device according to the command wherein, if the amplitude of the one signal is larger than a predetermined amplitude, the processor is configured to not change the command of the operation of the output unit.

12. An electronic device comprising:
a case;
an angular velocity sensor fixed to the case and sending a plurality of signals according to a plurality of components of an angular velocity applied to the case, the plurality of components of the angular velocity being about a plurality of axes, respectively;
a data memory storing a reference profile;
an output unit operating in an operation mode corresponding to the reference profile; and
a processor operable to cause the output unit to operate according to the signals sent from the angular velocity sensor,
wherein the reference profile contains a plurality of components which are compared with the plurality of signals, respectively,
wherein the processor is operable to:
cause the output unit to operate in an operation mode; and determine, according to one signal of the plurality of signals, whether or not the processor causes the output unit to operate in the operation mode, and
wherein, if a ratio of the amplitude of the one signal to a maximum amplitude out of the plurality of signals is larger than a predetermined ratio, the processor does not change the operation mode of the output unit.

* * * * *